(12) United States Patent
Nishimura et al.

(10) Patent No.: US 10,889,309 B2
(45) Date of Patent: Jan. 12, 2021

(54) BEARING MONITORING DEVICE OF RAILCAR

(71) Applicant: KAWASAKI JUKOGYO KABUSHIKI KAISHA, Kobe (JP)

(72) Inventors: Takehiro Nishimura, Kobe (JP); Yoshi Sato, Sanda (JP); Keiichiro Kamura, Kobe (JP); Masayuki Mitsue, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 226 days.

(21) Appl. No.: 16/080,074

(22) PCT Filed: Jan. 17, 2017

(86) PCT No.: PCT/JP2017/001338
§ 371 (c)(1),
(2) Date: Aug. 27, 2018

(87) PCT Pub. No.: WO2017/145574
PCT Pub. Date: Aug. 31, 2017

(65) Prior Publication Data
US 2019/0047598 A1    Feb. 14, 2019

(30) Foreign Application Priority Data

Feb. 25, 2016 (JP) .................... 2016-034207

(51) Int. Cl.
*B61K 9/04* (2006.01)
*F16C 41/00* (2006.01)
(Continued)

(52) U.S. Cl.
CPC ............ *B61K 9/04* (2013.01); *B61L 15/0081* (2013.01); *F16C 19/525* (2013.01); *F16C 41/00* (2013.01);
(Continued)

(58) Field of Classification Search
CPC ....... B61K 9/04; B61L 15/0081; F16C 19/52; F16C 19/525; F16C 41/00; G01K 1/024; G01K 1/14; G01K 13/08; G01K 13/04
See application file for complete search history.

(56) References Cited

U.S. PATENT DOCUMENTS 3,500,091 A * 3/1970 Jones ...................... G01P 3/488
310/168
5,023,547 A * 6/1991 Pawlak ................... G01P 3/488
188/181 R
(Continued)

FOREIGN PATENT DOCUMENTS

JP    S57-189261 U    12/1982
JP    H09-79915 A     3/1997
(Continued)

*Primary Examiner* — Jason C Smith
(74) *Attorney, Agent, or Firm* — Oliff PLC

(57) ABSTRACT

Provided is a bearing monitoring device of a railcar, the bearing monitoring device being configured to monitor a bearing of a bogie supporting a carbody, the bearing monitoring device including: a receiving unit configured to receive a data piece of a temperature of the bearing and at least one of a data piece of a load of the bearing and a data piece of a rotating speed of the bearing; and a diagnostic unit configured to, when a monitoring value exceeds a variable threshold, determine that an abnormality of the bearing has occurred, the monitoring value being at least one of a temperature value and a temperature increase rate, the at least one of the temperature value and the temperature increase rate being obtained from the data piece of the temperature of the bearing received by the receiving unit, wherein when at least one of a value of the data piece of the load and a value of the data piece of the rotating speed decreases, the diagnostic unit lowers the variable threshold.

10 Claims, 4 Drawing Sheets

(51) Int. Cl.
  *F16C 19/52*  (2006.01)
  *G01K 1/14*  (2006.01)
  *G01M 13/04*  (2019.01)
  *G01K 1/02*  (2006.01)
  *G01K 13/08*  (2006.01)
  *B61L 15/00*  (2006.01)
  *G01N 25/20*  (2006.01)
  *F16C 17/24*  (2006.01)

(52) U.S. Cl.
  CPC ............... *G01K 1/024* (2013.01); *G01K 1/14* (2013.01); *G01K 13/08* (2013.01); *G01M 13/04* (2013.01); *F16C 17/24* (2013.01); *F16C 19/52* (2013.01); *F16C 2233/00* (2013.01); *F16C 2326/10* (2013.01); *G01N 25/20* (2013.01)

(56) References Cited

U.S. PATENT DOCUMENTS

| | | | | |
|---|---|---|---|---|
| 5,381,090 | A * | 1/1995 | Adler | G01K 13/08 188/DIG. 1 |
| 5,567,058 | A * | 10/1996 | Morita | G01P 3/443 324/174 |
| 5,899,573 | A * | 5/1999 | Morita | G01P 3/443 324/174 |
| 5,938,346 | A * | 8/1999 | Ouchi | F16C 41/007 384/448 |
| 6,161,962 | A * | 12/2000 | French | B61F 15/20 384/448 |
| 6,229,298 | B1 * | 5/2001 | Sakamoto | G01P 3/443 324/174 |
| 6,894,484 | B2 * | 5/2005 | Takizawa | B60T 8/171 310/155 |
| 6,948,856 | B2 * | 9/2005 | Takizawa | F16C 19/525 384/448 |
| 7,453,262 | B2 * | 11/2008 | Kawasaki | G01P 1/026 324/174 |
| 7,497,131 | B2 * | 3/2009 | Sentoku | G01L 5/0009 73/862.322 |
| 9,234,910 | B2 * | 1/2016 | Semmelrodt | G01P 13/00 |
| 2002/0030482 | A1 * | 3/2002 | Iwamoto | F16C 41/007 324/174 |
| 2005/0140357 | A1 | 6/2005 | Takizawa et al. | |
| 2005/0283298 | A1 * | 12/2005 | Ochi | B60W 10/06 701/67 |

FOREIGN PATENT DOCUMENTS

| | | |
|---|---|---|
| JP | 2002-168242 A | 6/2002 |
| JP | 2003-269447 A | 9/2003 |
| JP | 2004-150504 A | 5/2004 |
| JP | 2006-001338 A | 1/2006 |
| JP | 2008-209168 A | 9/2008 |
| JP | 2010-179706 A | 8/2010 |
| JP | 2012-098253 A | 5/2012 |
| JP | 2013-213416 A | 10/2013 |
| JP | 2015-169610 A | 9/2015 |
| WO | 2015-100425 A1 | 7/2015 |

* cited by examiner

BEARING MONITORING DEVICE OF RAILCAR

TECHNICAL FIELD

The present invention relates to a railcar bearing monitoring device configured to monitor a bearing of a bogie supporting a carbody.

BACKGROUND ART

Known is a device configured to: detect a temperature of a bearing supporting an axle of a bogie of a railcar; and when the temperature exceeds a reference value, determine that an abnormality of the bearing has occurred (see PTL 1, for example). Also known is a device configured to detect the abnormality of the bearing by comparing a threshold with a relative temperature difference between a temperature of one bearing and an average value of temperatures of a plurality of bearings (see PTL 2, for example).

CITATION LIST

Patent Literature

PTL 1: Japanese Laid-Open Patent Application Publication No. 9-79915
PTL 2: Japanese Laid-Open Patent Application Publication No. 2012-98253

SUMMARY OF INVENTION

Technical Problem

Even when the bearing does not have any abnormality, the temperature of the bearing may easily increase or may hardly increase depending on a use situation of the bearing. Therefore, according to the device of PTL 1, when the reference value is set to a large value so as to correspond to the use situation where the temperature of the bearing easily increases, but the use situation is a situation where the temperature of the bearing hardly increases, the temperature of the bearing does not exceed the reference value even after the start of the generation of the abnormality of the bearing, and therefore, abnormality detection delay occurs. In contrast, when the reference value is set to a small value so as to correspond to the use situation where the temperature of the bearing hardly increases, but the use situation is a situation where the temperature of the bearing easily increases, the temperature of the bearing exceeds the reference value during a normal increase in the temperature of the bearing, and therefore, the abnormality of the bearing is erroneously detected. Further, according to the device of PTL 2, when the plurality of bearings are simultaneously overheated, the relative temperature difference between the temperature of one bearing and the average value of the temperatures of the bearings does not change, so that the abnormality of the bearing cannot be appropriately detected.

An object of the present invention is to realize both early detection of a bearing abnormality and prevention of erroneous detection of the bearing abnormality regardless of a use situation of a bearing in a railcar.

Solution to Problem

A railcar bearing monitoring device according to one aspect of the present invention is a bearing monitoring device of a railcar, the bearing monitoring device being configured to monitor a bearing of a bogie supporting a carbody, the bearing monitoring device including: a receiving unit configured to receive a data piece of a temperature of the bearing and at least one of a data piece of a load of the bearing and a data piece of a rotating speed of the bearing; and a diagnostic unit configured to, when a monitoring value exceeds a variable threshold, determine that an abnormality of the bearing has occurred, the monitoring value being at least one of a temperature value and a temperature increase rate, the at least one of the temperature value and the temperature increase rate being obtained from the data piece of the temperature of the bearing received by the receiving unit, wherein when at least one of a value of the data piece of the load and a value of the data piece of the rotating speed decreases, the diagnostic unit lowers the variable threshold.

According to the above configuration, in a situation where at least one of the value of the load of the bearing and the value of the rotating speed of the bearing decreases, and therefore, the bearing is hardly overheated, the variable threshold is lowered, and with this, an abnormal temperature increase of the bearing can be detected early. In contrast, in a situation where at least one of the value of the load of the bearing and the value of the rotating speed of the bearing increases, and therefore, the bearing is easily overheated, the variable threshold is raised, and with this, a normal temperature increase of the bearing can be prevented from being erroneously detected as an abnormality.

Advantageous Effects of Invention

The present invention can realize both the early detection of the bearing abnormality and the prevention of the erroneous detection of the bearing abnormality regardless of the use situation of the bearing in the railcar.

DESCRIPTION OF EMBODIMENTS

Figure 1:
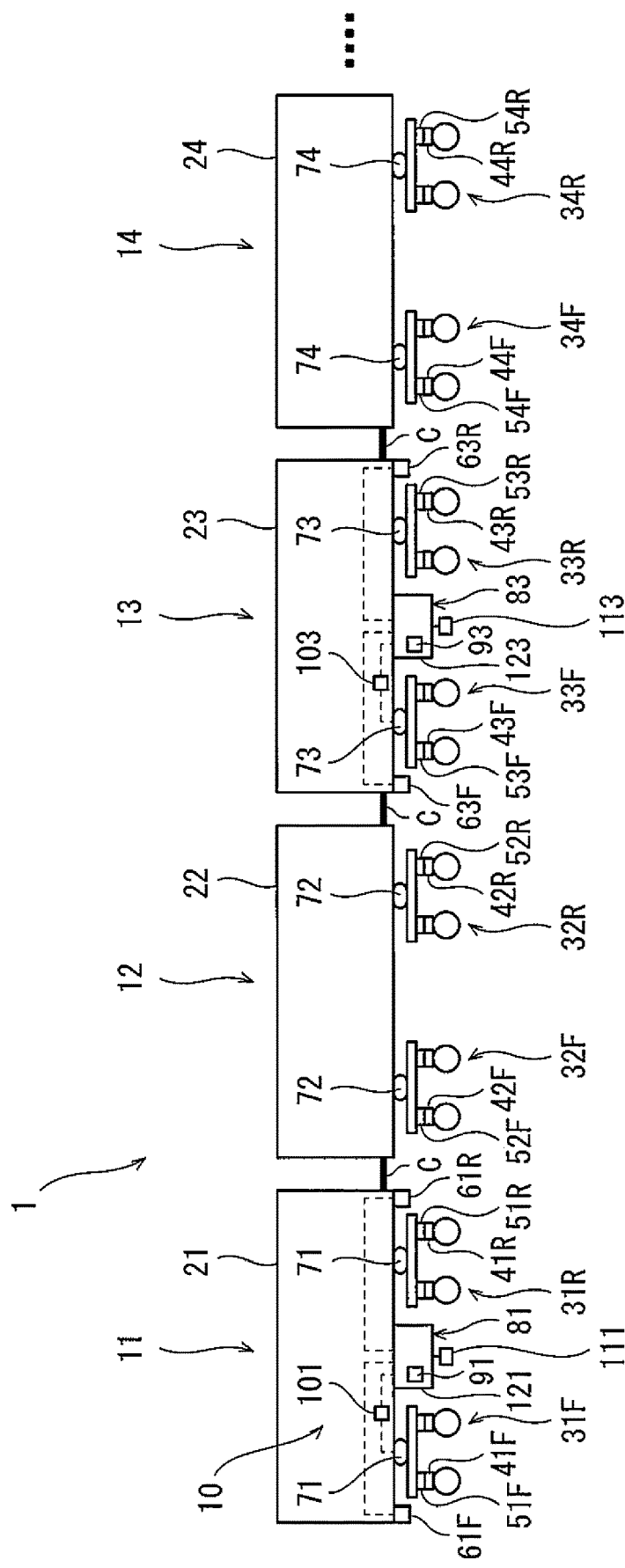
FIG. 1 is a schematic diagram of a train set equipped with a railcar bearing monitoring device according to an embodiment.

Hereinafter, an embodiment will be explained with reference to the drawings.
FIG. 1 is a schematic diagram of a train set 1 equipped with a railcar bearing monitoring device 10 according to the embodiment. As shown in FIG. 1, the train set 1 includes a first car 11, a second car 12 adjacent to the first car 11, a third car 13 adjacent to the second car 12, and a fourth car 14 adjacent to the third car 13. The train set 1 is constituted by coupling the cars 11 to 14 in series through couplers C. FIG. 1 shows only four cars of the train set including five or more cars. However, the number of cars of the train set is not limited to this.

The first car 11 includes a first carbody 21 and a pair of first bogies 31F and 31R arranged close to both respective longitudinal direction end portions of the first carbody 21 and supporting the first carbody 21. The second car 12 includes a second carbody 22 and a pair of second bogies 32F and 32R arranged close to both respective longitudinal direction end portions of the second carbody 22 and supporting the second carbody 22. The third car 13 includes a third carbody 23 and a pair of third bogies 33F and 33R arranged close to both respective longitudinal direction end portions of the third carbody 23 and supporting the third carbody 23. The fourth car 14 includes a fourth carbody 24 and a pair of fourth bogies 34F and 34R arranged close to both respective longitudinal direction end portions of the fourth carbody 24 and supporting the fourth carbody 24. In each of the first to fourth cars 11 to 14, each of air springs (first to fourth air springs 71 to 74) is interposed between the carbody (carbodies 21 to 24) and the bogie (bogies 31F to 34F and 31R to 34R).

The train set 1 is equipped with the railcar bearing monitoring device 10. The bearing monitoring device 10 is a device configured to detect abnormalities of bearings BR in axle boxes BX of the bogies 31F to 34F and 31R to 34R by monitoring temperatures, applied loads (hereinafter simply referred to as "loads"), and rotating speeds of the bearings BR. The bearing monitoring device 10 includes: first to fourth bearing temperature sensors 41F to 44F and 41R to 44R; first to fourth wireless transmitters 51F to 54F and 51R to 54R; first and second wireless receivers 61F, 61R, 63F, and 63R; first and second data processing devices 81 and 83 including respective first and second acceleration sensors 91 and 93 (state sensors); first and second air spring pressure sensors 101 and 103 (state sensors); and first and second ambient temperature sensors 111 and 113.

The first to fourth bearing temperature sensors 41F to 44F and 41R to 44R are provided at the axle boxes BX of the first to fourth bogies 31F to 34F and 31R to 34R and detect the temperatures of the bearings BR in the axle boxes BX. To be specific, four bearing temperature sensors are provided at each bogie, and the temperatures of all the bearings of the bogies are detected. Each of the bearing temperature sensors 41F to 44F and 41R to 44R contacts the corresponding bearing BR to directly detect the temperature of the bearing BR. However, each of the bearing temperature sensors 41F to 44F and 41R to 44R may contact the corresponding axle box BX, not the corresponding bearing BR, and may indirectly detect the temperature of the corresponding bearing BR by detecting the temperature of the corresponding axle box BX.

The first to fourth wireless transmitters 51F to 54F and 51R to 54R are provided at the respective axle boxes BX so as to correspond to the respective first to fourth bearing temperature sensors 41F to 44F and 41R to 44R. The first to fourth wireless transmitters 51F to 54F and 51R to 54R wirelessly transmit sensor signals containing temperature information pieces detected by the bearing temperature sensors 41F to 44F and 41R to 44R. In the present embodiment, the wireless transmitter and the bearing temperature sensor are accommodated in one casing, and the casing is attached to the axle box. As with the bearing temperature sensors, the number of wireless transmitters provided at each bogie is four.

The first wireless receivers 61F and 61R are provided at respective front and rear portions of the first carbody 21, and the second wireless receivers 63F and 63R are provided at respective front and rear portions of the third carbody 23. The wireless receivers are provided at every other car, and the wireless receivers are not provided at any of the second car 12 and the fourth car 14. To be specific, the train set 1 is constituted by alternately coupling the car including the wireless receivers and the car not including the wireless receivers. The first wireless receiver 61F is provided at a lower portion of one end portion of the first carbody 21, and the first wireless receiver 61F is provided at a lower portion of the other end portion of the first carbody 21. The second wireless receiver 63F is provided at a lower portion of one end portion of the third carbody 23, and the second wireless receiver 63R is provided at a lower portion of the other end portion of the third carbody 23.

The first wireless receiver 61F receives the sensor signals wirelessly transmitted from the four wireless transmitters 51F. The first wireless receiver 61R receives the sensor signals wirelessly transmitted from the four first wireless transmitters 51R and the four second wireless transmitters 52F. To be specific, the first wireless receiver 61R receives the sensor signals of the first bogie 31R of the own car and the sensor signals of the second bogie 32F of the adjacent car. The second wireless receiver 63F receives the sensor signals wirelessly transmitted from the four second wireless transmitters 52R and the four third wireless transmitters 53F. The second wireless receiver 63R receives the sensor signals wirelessly transmitted from the four third wireless transmitters 53R and the four fourth wireless transmitters 54F.

The first data processing device 81 is provided at the first carbody 21, and the second data processing device 83 is provided at the third carbody 23. The data processing device is not provided at any of the second car 12 and the fourth car 14. To be specific, the data processing device is provided at the car at which the wireless receivers connected to the data processing device are provided. The first data processing device 81 is connected to the first wireless receivers 61F and 61R through a communication line. The second data processing device 83 is connected to the second wireless receivers 63F and 63R through a communication line. Data pieces stored in the first and second data processing devices 81 and 83 are accessible from an outside. For example, each of the first and second data processing devices 81 and 83 is configured such that the data pieces are extractable through a communication line, a recording medium, or the like, not shown.

The first data processing device 81 includes a casing 121 attached to the first carbody 21 and is arranged under a floor of the first carbody 21. The second data processing device 83 includes a casing 123 attached to the third carbody 23 and is arranged under a floor of the third carbody 23. With this, since the data processing device (81, 83) is provided at a position close to both the bearing temperature sensors (41F to 44F, 41R to 44R) and the air spring pressure sensor (101, 103), device cost and installation work can be reduced, and communication stability can be improved. Further, the first acceleration sensor 91 is accommodated in the casing 121 of the first data processing device 81, and the second acceleration sensor 93 is accommodated in the casing 123 of the second data processing device 83. With this, wires of the acceleration sensors 91 and 93 can be reduced, and therefore, the device cost and the installation work can be reduced. Each of the acceleration sensors 91 and 93 detects car longitudinal direction acceleration, i.e., car traveling direction acceleration. As described below, the acceleration sensors 91 and 93 are used in the first and second data processing devices 81 and 83 to calculate the rotating speeds of the bearings BR of the bogies 31F to 34F and 31R to 34R.

The first air spring pressure sensor 101 is provided at the first carbody 21 and detects an internal pressure value of the first air spring 71 interposed between the first carbody 21 and the first bogie 31F. The second air spring pressure sensor 103 is provided at the third carbody 23 and detects an internal pressure value of the third air spring 73 interposed between the third carbody 23 and the third bogie 33F. The first air spring pressure sensor 101 is connected to the first data processing device 81, and the second air spring pressure sensor 103 is connected to the second data processing device 83. As described below, the first air spring pressure sensor 101 is used to calculate the loads of the bearings BR of the first bogies 31F and 31R in the first data processing device 81, and the second air spring pressure sensor 103 is used to calculate the loads of the bearings BR of the third bogies 33F and 33R in the second data processing device 83.

As described above, the sensors 91, 93, 101, and 103 used to calculate the rotating speeds and loads of the bearings BR are provided at the carbodies, not the bogies. Therefore, the sensors 91, 93, 101, and 103 do not have to be attached to the bearings BR, and communication lines between the sensors 91, 93, 101, and 103 and the data processing devices 81 and 83 do not have to be arranged at the bogies. Thus, the device cost and the installation work can be reduced.

The first and second ambient temperature sensors 111 and 113 are connected to the first and second data processing devices 81 and 83, respectively, and detect an ambient temperature outside the train set 1. For example, the first ambient temperature sensor 111 is arranged under the first data processing device 81 through the casing 121 of the first data processing device 81, and the second ambient temperature sensor 113 is arranged under the second data processing device 83 through the casing 123 of the second data processing device 83. As above, the ambient temperature sensor 111 is adequately separated downward from the floor of the carbody 21, and the ambient temperature sensor 113 is adequately separated downward from the floor of the carbody 23. In addition, the data processing device 81 is interposed between the carbody 21 and the ambient temperature sensor 111, and the data processing device 83 is interposed between the carbody 23 and the ambient temperature sensor 113. Therefore, thermal influences on the ambient temperature sensors 111 and 113 by heat radiated from the carbodies 21 and 23 can be suppressed.

Figure 2:
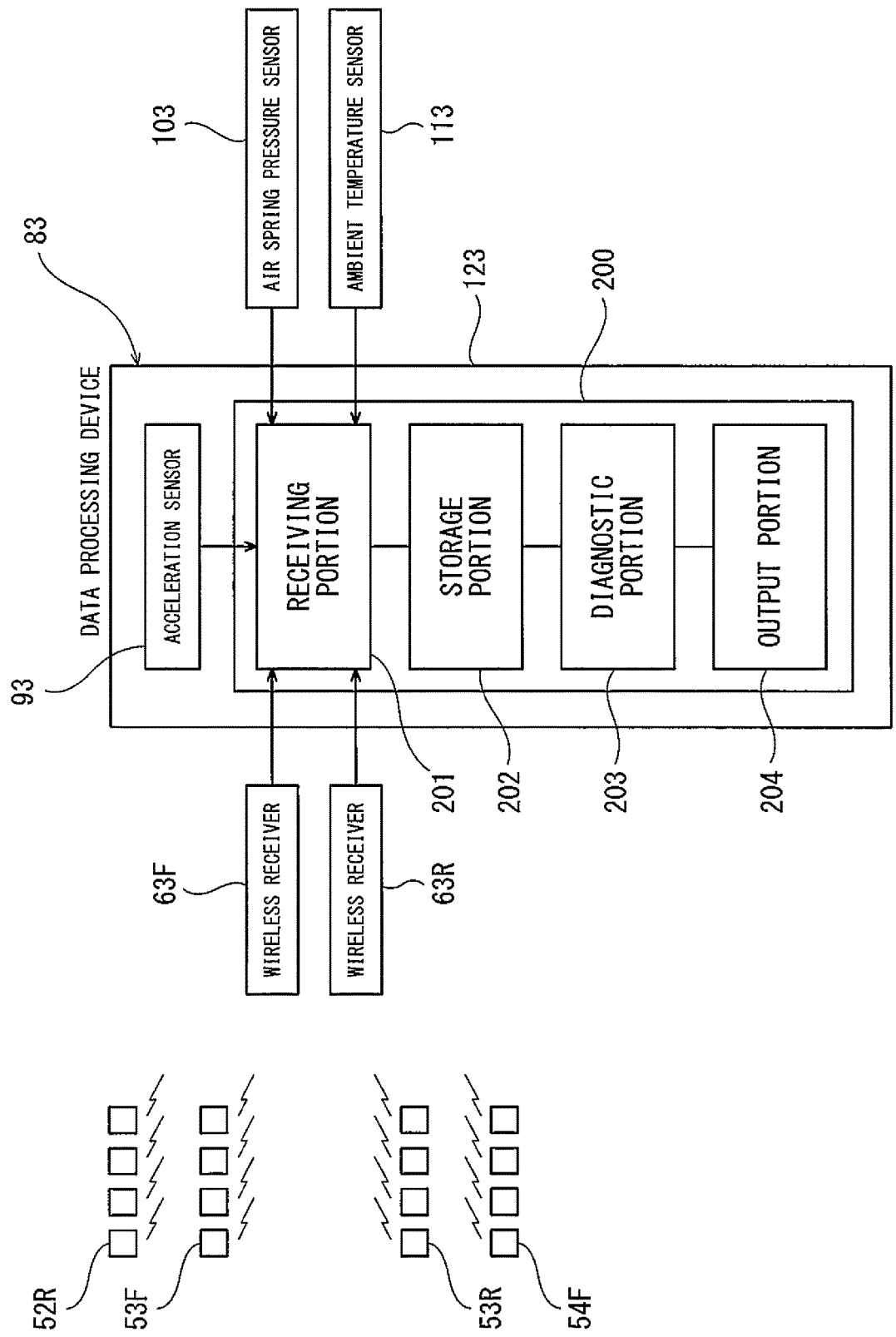
FIG. 2 is a block diagram of the bearing monitoring device shown in FIG. 1.

FIG. 2 is a block diagram of the bearing monitoring device 10 shown in FIG. 1. In the bearing monitoring device 10, the components mounted on the first car 11 and the components mounted on the third car 13 are practically the same as each other. Therefore, the components mounted on the third car 13 will be mainly explained with reference to FIG. 2. As shown in FIG. 2, the data processing device 83 includes a data processing unit 200 and the acceleration sensor 93 in the casing 123. The data processing unit 200 includes a processor, a volatile memory, a non-volatile memory, an I/O interface, and the like. The data processing unit 200 includes a receiving portion 201, a storage portion 202, a diagnostic portion 203, and an output portion 204. The receiving portion 201 and the output portion 204 are realized by the I/O interface. The storage portion 202 is realized by the volatile memory and the non-volatile memory. The diagnostic portion 203 is realized by the processor which performs arithmetic processing using the volatile memory in accordance with a program stored in the non-volatile memory.

The receiving portion 201 receives information pieces of the temperatures of the sixteen bearings BR from the wireless receivers 63F and 63R which have received the information pieces from the wireless transmitters 52R, 53F, 53R, and 54F. The receiving portion 201 receives a data piece of the car traveling direction acceleration from the acceleration sensor 93. The receiving portion 201 receives a data piece of the internal pressure value of the air spring 73 from the air spring pressure sensor 103. The receiving portion 201 receives a data piece of the ambient temperature from the ambient temperature sensor 113. The storage portion 202 stores the data pieces received by the receiving portion 201. Based on the data pieces stored in the storage portion 202, the diagnostic portion 203 diagnoses states of all the bearings BR of the four bogies 32R, 33F, 33R, and 34F. The output portion 204 outputs a result of the determination of the diagnostic portion 203 in a predetermined mode (such as transmission, display, or warning sound).

Figure 3:
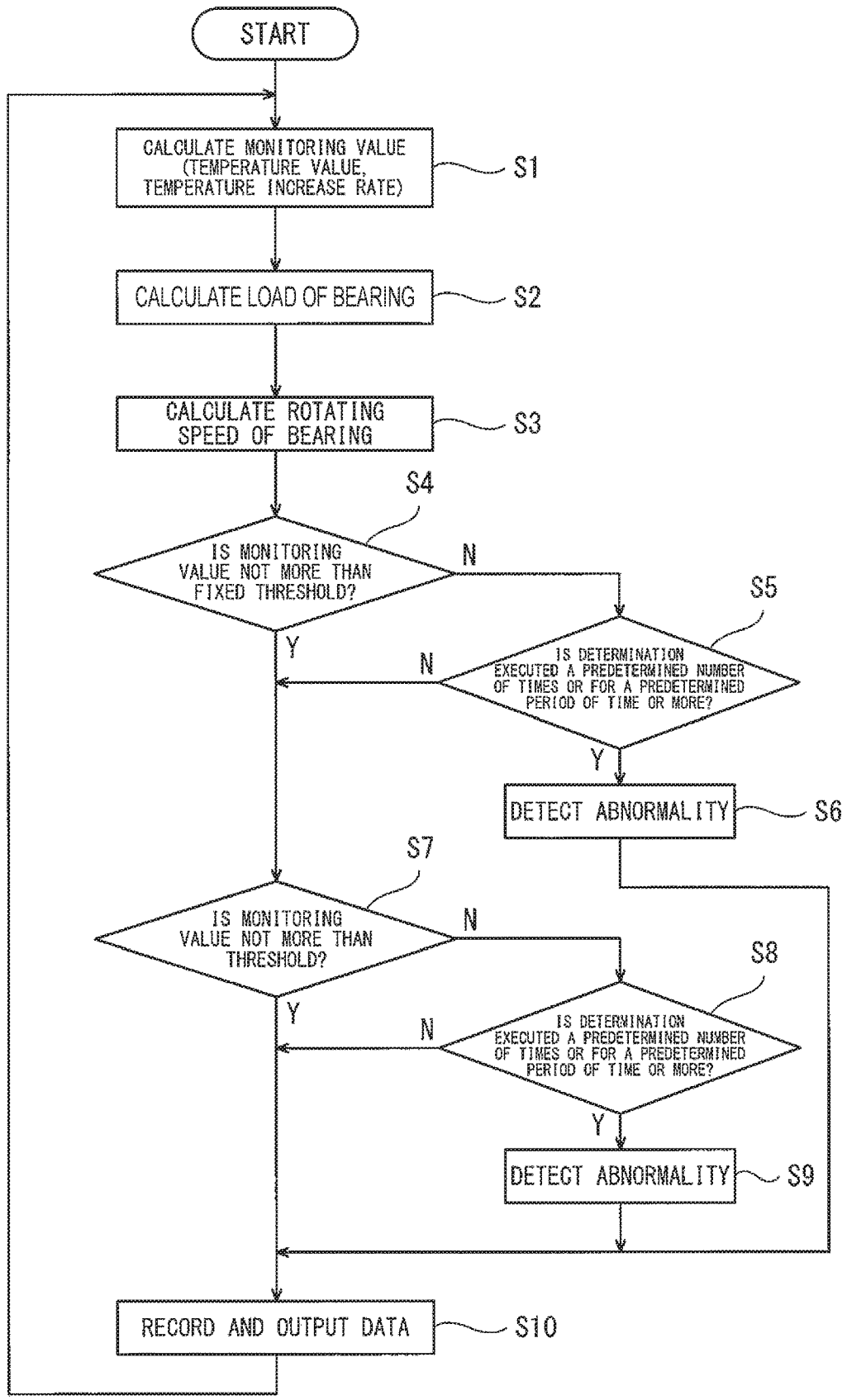
FIG. 3 is a flow chart of a diagnostic process of the bearing monitoring device shown in FIG. 2.

FIG. 3 is a flow chart of a diagnostic process of the bearing monitoring device 10 shown in FIG. 2. As shown in FIGS. 2 and 3, first, the diagnostic portion 203 calculates a monitoring value form a data piece of the bearing temperature received by the receiving portion 201, the monitoring value being used to monitor the state of the bearing BR (Step S1). Specifically, the diagnostic portion 203 calculates a temperature value $\Delta T_n$ as a first monitoring value, the temperature value $\Delta T_n$ being obtained by subtracting an ambient temperature $T_0$ from a bearing temperature $T_n$ (n is an integer of 1 to 16), the ambient temperature $T_0$ being detected by the ambient temperature sensor 113, the bearing temperature $T_n$ being received by the receiving portion 201. With this, a decrease in accuracy of the detection of the abnormality by a fluctuation of the ambient temperature can be prevented. Further, the diagnostic portion 203 calculates a temperature increase rate $(d/dt)\cdot\Delta T_n$ as a second monitoring value, the temperature increase rate $(d/dt)\cdot\Delta T_n$ being a positive time change rate of the bearing temperature $T_n$ received by the receiving portion 201.

Next, the diagnostic portion 203 calculates a load F by using an internal pressure value P of the air spring 73, the load F being applied to the bearing BR in a vertical direction, the internal pressure value P being detected by the air spring pressure sensor 103 (Step S2). Specifically, the diagnostic portion 203 calculates the load F of the bearing BR by Formula 1 below. In Formula 1, A denotes a pressure receiving area of the air spring, and W denotes the weight of a member interposed between the air spring and the bearing in the bogie.

$$F=(P\cdot A+W/2)/2 \qquad \text{Formula 1}$$

As above, the load applied to the bearing BR is calculated from the internal pressure value of the air spring 71 or 73. With this, unlike conventional cases, a strain gauge does not have to be attached to each bearing BR. Therefore, the device cost and the installation work can be reduced. Since the internal pressure values of the air springs 71 to 74 of the cars 11 to 14 are considered to differ little from one another, the internal pressure values of the air springs 71 and 73 of the first and third cars 11 and 13 are also used as the internal pressure values of the air springs 72 and 74 of the second and fourth cars 12 and 14 on which the data processing device (81, 83) is not mounted. For example, the internal pressure value of the air spring 71 of the first car 11 is used as the internal pressure value of the air spring 72 located close to the first car 11 out of the air springs 72 of the second car 12, and the internal pressure value of the air spring 73 of the third car 13 is used as the internal pressure value of the air spring 72 located close to the third car 13 out of the air springs 72 of the second car 12. With this, wires between the cars can be prevented from increasing. Thus, the device cost and the installation work can be reduced.

Next, the diagnostic portion 203 calculates a rotating speed N of the bearing BR from car traveling direction acceleration Acc detected by the acceleration sensor 93 (Step S3). Specifically, the diagnostic portion 203 calculates the rotating speed N of the bearing BR by Formula 2 below. In Formula 2, D denotes a wheel diameter of the bogie, and π denotes the ratio of the circumference of a circle to its diameter. As above, since the rotating speed N of the bearing BR is calculated from the acceleration detected by the acceleration sensor 93 provided at the carbody, wires between the carbody and the bogie are reduced. Thus, the device cost and the installation work can be reduced.

$$N=\int Acc \cdot dt/(\pi D) \quad \text{Formula 2}$$

Next, the diagnostic portion 203 determines whether or not the first monitoring value (temperature value $\Delta T_n$) is not more than each of fixed thresholds $TH_{X1}$ and $TH_{X2}$ ($TH_{X1} < TH_{X2}$) and also determines whether or not the second monitoring value (temperature increase rate $(d/dt) \cdot \Delta T_n$) is not more than each of fixed thresholds $TH_{Y1}$ and $TH_{Y2}$ ($TH_{Y1} < TH_{Y2}$) (Step S4). Specifically, when it is determined that the temperature value ΔT has exceeded the fixed threshold $TH_{X1}$, and this determination is executed a predetermined number of times or for a predetermined period of time or more (Step S5), the diagnostic portion 203 determines that a slight abnormality has occurred, and the output portion 204 performs an output informing that the slight abnormality has occurred (Step S6). The slight abnormality is recorded in the storage portion 202 (Step S10). When it is determined that the temperature value $\Delta T_n$ has exceeded the fixed threshold $TH_{X2}$, and this determination is executed a predetermined number of times or for a predetermined period of time or more (Step S5), the diagnostic portion 203 determines that a serious abnormality has occurred, and the output portion 204 performs an output informing that the serious abnormality has occurred (Step S6). The serious abnormality is recorded in the storage portion 202 (Step S10).

Similarly, when it is determined that the temperature increase rate $(d/dt) \cdot \Delta T_n$ has exceeded the fixed threshold $TH_{Y1}$ ($TH_{Y2}$), and this determination is executed a predetermined number of times or for a predetermined period of time or more (Step S5), the diagnostic portion 203 determines that the slight (serious) abnormality has occurred, and the output portion 204 performs an output informing that the abnormality has occurred (Step S6). The abnormality is recorded in the storage portion 202 (Step S10). As above, when the abnormality is detected based on the fixed threshold in Steps S4 to S6, the process proceeds to Step S10 without executing a below-described comparison (Step S7) between the monitoring value and a variable threshold.

When it is determined in Step S4 that each of the temperature value and the temperature increase rate is not more than any of the fixed thresholds, the diagnostic portion 203 determines whether or not the first monitoring value (temperature value $\Delta T_n$) is not more than a first variable threshold $TH_a$, and also determines whether or not the second monitoring value (temperature increase rate $(d/dt) \cdot \Delta T_n$) is not more than a second variable threshold $TH_b$ (Step S7).

Figure 4A:
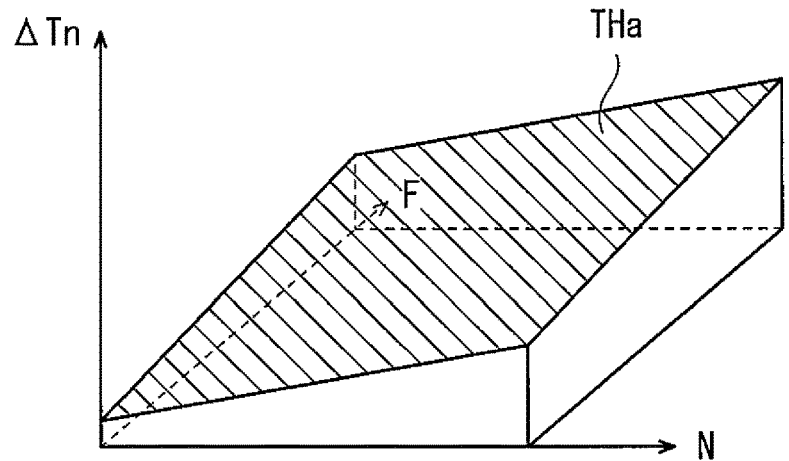
FIG. 4A is a diagram showing a relation among a first variable threshold of a temperature value that is a monitoring value, a load, and a rotating speed.
Figure 4B:
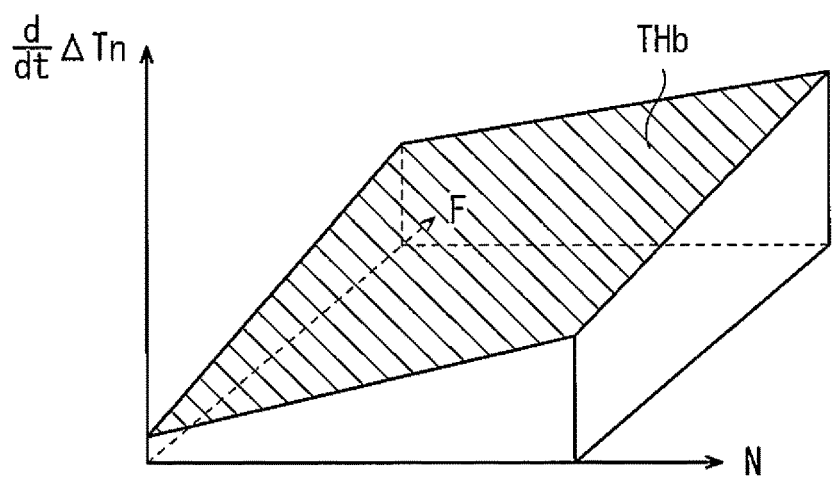
FIG. 4B is a diagram showing a relation among a second variable threshold of a temperature increase rate that is a monitoring value, the load, and the rotating speed.
Figure 5:
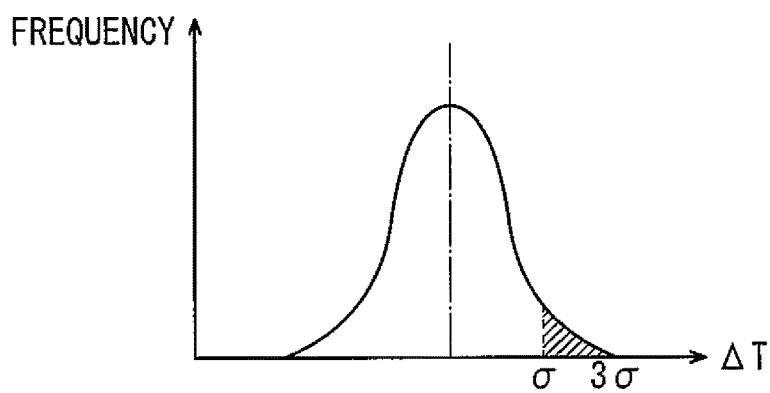
FIG. 5 shows an example of a distribution (operational performance) of generation frequency of the monitoring value based on a specific bearing load and a specific rotating speed.

As shown in FIG. 4A, the first variable threshold $TH_a$ for the temperature value is set so as to decrease as the load F of the bearing BR decreases and is also set so as to decrease as the rotating speed N of the bearing BR decreases. As shown in FIG. 4B, similarly, the second variable threshold $TH_b$ for the temperature increase rate is set so as to decrease as the load F of the bearing BR decreases and is also set so as to decrease as the rotating speed N of the bearing BR decreases. When setting the variable thresholds $TH_a$ and $TH_b$, a distribution (operational performance) of generation frequency of the monitoring value (the temperature value, the temperature increase rate) obtained by making the train set 1 actually travel in advance is prepared for each specific bearing load and each specific rotating speed. Then, a value selected from values in a range of σ to 3σ in the generation frequency of the monitoring value is determined as each of the variable thresholds $TH_a$ and $TH_b$.

The variable thresholds $TH_a$ and $TH_b$ may be stored in the storage portion 202 as a three-dimensional table or may be calculated by an arithmetic formula in which the load and rotating speed of the bearing are inputs. Further, each of the variable thresholds $TH_a$ and $TH_b$ decreases like a linear function as the load F and/or the rotating speed N decrease. However, each of the variable thresholds $TH_a$ and $TH_b$ may decrease like a nonlinear function or stepwise. To be specific, the variable threshold ($TH_a$, $TH_b$) when each of the load F and the rotating speed N is a second value is only required to be set to be smaller than the variable threshold ($TH_a$, $TH_b$) when each of the load F and the rotating speed N is a first value (second value<first value).

When it is determined in Step S7 that the first monitoring value (temperature value ΔT) has exceeded the first variable threshold $TH_a$, and this determination is executed a predetermined number of times or for a predetermined period of time or more (Step S8), the diagnostic portion 203 determines that the slight abnormality has occurred, and the output portion 204 performs an output informing that the slight abnormality has occurred (Step S9). The slight abnormality is recorded in the storage portion 202 (Step S10). Similarly, when it is determined in Step S7 that the second monitoring value (temperature increase rate $(d/dt) \cdot \Delta T_n$) has exceeded the second variable threshold $TH_b$, and this determination is executed a predetermined number of times or for a predetermined period of time or more (Step S8), the diagnostic portion 203 determines that the slight abnormality has occurred, and the output portion 204 performs an output informing that the slight abnormality has occurred (Step S9). The slight abnormality is recorded in the storage portion 202 (step 10).

In a situation where the load F and/or rotating speed N of the bearing BR decrease, and therefore, the bearing BR is hardly overheated, the diagnostic portion 203 lowers the variable thresholds $TH_a$ and $TH_b$. With this, an abnormal temperature increase of the bearing BR can be detected early. In contrast, in a situation where the load F and/or rotating speed N of the bearing BR increase, and therefore, the bearing BR is easily overheated, the diagnostic portion 203 raises the variable thresholds $TH_a$ and $TH_b$. With this, a normal temperature increase of the bearing BR can be prevented from being erroneously detected as an abnormality. Further, when any one of the temperature value and the temperature increase rate exceeds the variable threshold, the diagnostic portion 203 determines that the abnormality has occurred. Therefore, the abnormal temperature increase of the bearing BR can be detected further early. For example, when the temperature increase rate exceeds the variable threshold although the temperature value does not exceed the variable threshold, the abnormality can be detected. Therefore, the sign of a trouble can be detected earlier than a case where only the temperature value is monitored.

The present invention is not limited to the above embodiment, and modifications, additions, and eliminations may be made with respect to the configuration of the present invention. In the above embodiment, one air spring pressure sensor is provided at each car, and the internal pressure values of the air springs of a pair of bogies are calculated. However, one air spring pressure sensor may be provided at each air spring. The data pieces of the actual internal pressure values of the air springs of the second and fourth cars are not input to any of the data processing devices of the first and third cars. However, the data pieces of the internal pressure values of the air springs of the second car and the data pieces of the internal pressure values of the air springs of the fourth car may be input to the data processing device of the first car and the data processing device of the third car, respectively, through wires or wirelessly. The acceleration sensor is provided at each data processing device. However, one acceleration sensor may be provided at the train set, and the data processing devices may share an acceleration information piece detected by the acceleration sensor. The ambient temperature sensor may be accommodated in the casing of the data processing device. The ambient temperature sensor may be arranged under the data processing unit in the casing of the data processing device. The monitoring value may be only one of the temperature value and the temperature increase rate. The temperature value may be the bearing temperature itself. The diagnostic portion 203 may be provided outside the car (for example, at a remote location), not at the data processing device, and may be configured to communicate with the data processing device.

REFERENCE SIGNS LIST 1 train set
10 bearing monitoring device
11 to 14 car
21 to 24 carbody
31F to 34F, 31R to 34R bogie
41F to 44F, 41R to 44R bearing temperature sensor
51F to 54F, 51R to 54R wireless transmitter
61F, 61R, 63F, 63R wireless receiver
71 to 74 air spring
81, 83 data processing device
91, 93 acceleration sensor
101, 103 air spring pressure sensor
121, 123 casing
201 receiving portion (receiving unit)
202 storage portion (storage unit)
203 diagnostic portion (diagnostic unit)
BR bearing

The invention claimed is:

1. A bearing monitoring device of a railcar, the bearing monitoring device being configured to monitor a bearing of at least one bogie supporting at least one carbody,
the bearing monitoring device comprising:
a receiving unit configured to receive a data piece of a temperature of the bearing and a data piece of a load of the bearing; and
a diagnostic unit configured to, when a monitoring value exceeds a variable threshold, determine that an abnormality of the bearing has occurred, the monitoring value being at least one of a temperature value and a temperature increase rate, the at least one of the temperature value and the temperature increase rate being obtained from the data piece of the temperature of the bearing received by the receiving unit, wherein
when a value of the data piece of the load decreases, the diagnostic unit lowers the variable threshold.

2. The bearing monitoring device according to claim 1, wherein:
the variable threshold includes a first variable threshold and a second variable threshold; and
when at least one of a first condition in which the temperature value has exceeded the first variable threshold and a second condition in which the temperature increase rate has exceeded the second variable threshold is satisfied, the diagnostic unit determines that the abnormality of the bearing has occurred.

3. The bearing monitoring device according to claim 2, wherein:
when the monitoring value has exceeded a fixed threshold, the diagnostic unit determines that the abnormality of the bearing has occurred;
when the monitoring value has exceeded the variable threshold, the diagnostic unit determines that a slight abnormality has occurred; and
when the monitoring value has exceeded the fixed threshold, the diagnostic unit determines that a serious abnormality has occurred.

4. The bearing monitoring device according to claim 3, wherein:
the receiving unit receives a data piece of an ambient temperature; and
the diagnostic unit calculates as the temperature value a value obtained by subtracting the ambient temperature from the temperature of the bearing.

5. The bearing monitoring device according to claim 1, wherein:
when the monitoring value has exceeded a fixed threshold, the diagnostic unit determines that the abnormality of the bearing has occurred;
when the monitoring value has exceeded the variable threshold, the diagnostic unit determines that a slight abnormality has occurred; and
when the monitoring value has exceeded the fixed threshold, the diagnostic unit determines that a serious abnormality has occurred.

6. The bearing monitoring device according to claim 2, wherein:
the receiving unit receives a data piece of an ambient temperature; and
the diagnostic unit calculates as the temperature value a value obtained by subtracting the ambient temperature from the temperature of the bearing.

7. The bearing monitoring device according to claim 1, wherein:
the receiving unit receives a data piece of an ambient temperature; and
the diagnostic unit calculates as the temperature value a value obtained by subtracting the ambient temperature from the temperature of the bearing.

8. The bearing monitoring device according to claim 5, wherein:
the receiving unit receives a data piece of an ambient temperature; and
the diagnostic unit calculates as the temperature value a value obtained by subtracting the ambient temperature from the temperature of the bearing.

9. The bearing monitoring device according to claim 1, wherein:
the bogie supports the carbody through an air spring,
the receiving portion receives a data piece of an internal pressure value of the air spring, and the diagnostic portion calculates a load applied to the bearing by using the internal pressure value of the air spring.

10. The bearing monitoring device according to claim 1, wherein:
the at least one bogie includes a first bogie and a second bogie,
the at least one carbody includes a first carbody and a second carbody,
the railcar comprises a first car on which a data processing device including the receiving portion and the diagnostic portion is mounted, and a second car on which a data processing device including the receiving portion and the diagnostic portion is not mounted,
the first car includes a first air spring interposed between the first bogie and the first carbody,
the second car includes a second air spring interposed between the second bogie and the second carbody,
an internal pressure value of the first air spring is used as an internal pressure value of the second air spring.

* * * * *